July 7, 1959     G. SAJECK     2,893,386
GAS DEMAND EQUIPMENT
Filed April 4, 1957
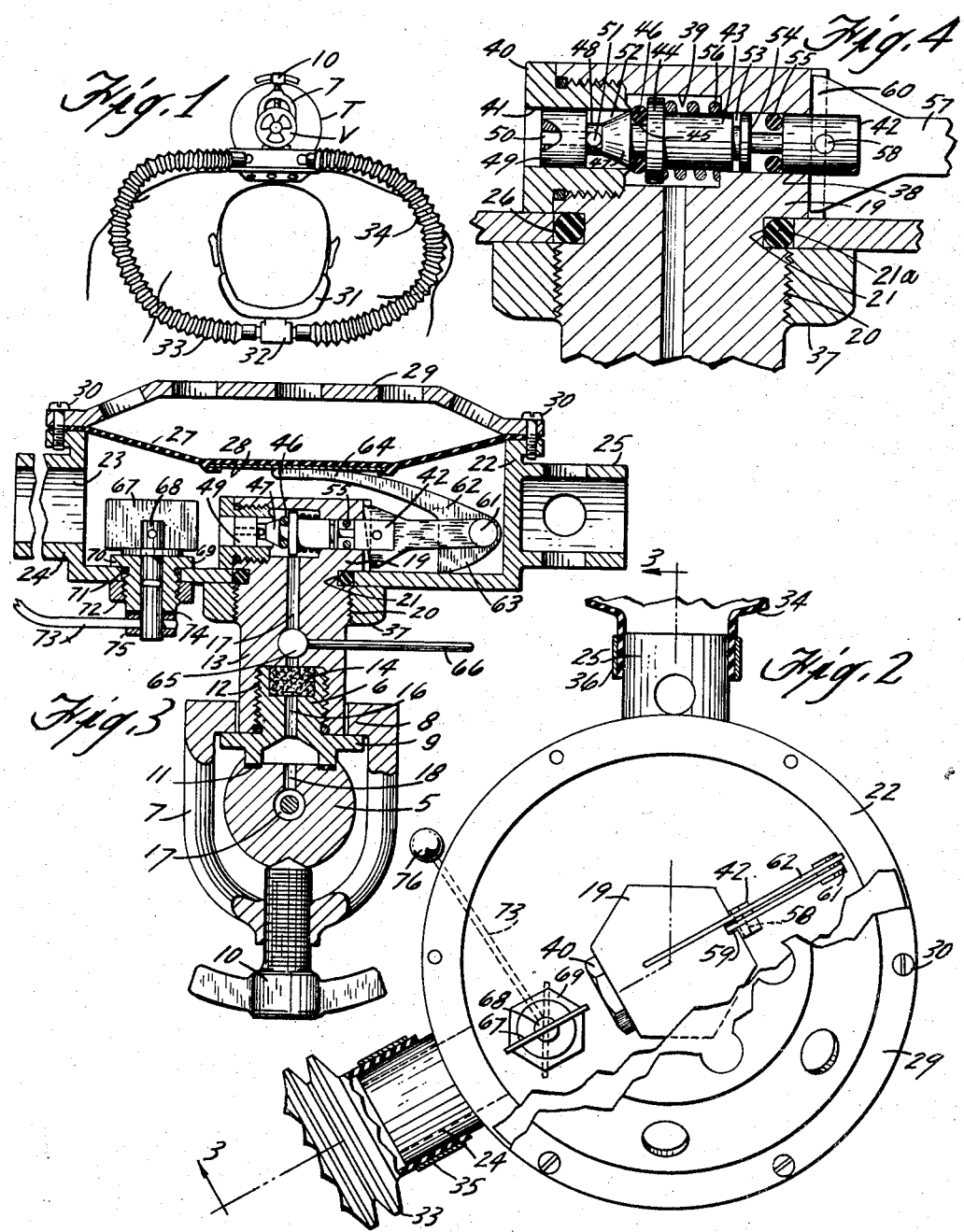
INVENTOR.
George Sajeck
BY
Louis O. French
Atty.

United States Patent Office 2,893,386
Patented July 7, 1959

2,893,386

GAS DEMAND EQUIPMENT

George Sajeck, Milwaukee, Wis.

Application April 4, 1957, Serial No. 650,760

6 Claims. (Cl. 128—142)

The invention relates to gas demand equipment such as used for supplying air to divers, firemen, miners, or to supply oxygen to aviators or patients needing oxygen.

Devices of the type above mentioned usually include a diaphragm operatively connected to the pressure gas supply valve and exposed to external gas pressures on one side and on its other side exposed to gas pressures in a housing from which the gas is delivered to the user. With this type of equipment the operator's first suction impulse in taking a breath opens the gas demand valve, but with the usual equipment under some operating conditions it requires considerable effort on the part of the user or operator to keep the gas demand valve open because the gas entering the housing acts to fill it up with gas which acts to move the diaphragm to valve closing position while the operator is trying to pull the diaphragm down and to keep the valve open for breathing. The above difficulties in keeping the valve open can be overcome where the outlet from the valve is arranged relative to the inlet to the operator's breather tube to produce a jet pump effect, that is, a suction effect on the gas within the housing to thereby relieve to a greater or less extent the tendency of the pressure gas acting on the diaphragm to close the gas supply valve. However, for practical purposes, the outlet of the gas supply into the housing has to be fixed relative to the inlet to the breather tube to secure this jet pump effect, and as a result under some conditions encountered in the use of this equipment more gas may be delivered to the operator than is needed. One object of this invention is to provide means under the control of the operator to vary the jet pump effect to suit the operator's demand for gas while operating in or out of water or other medium in which the equipment may be used.

A further object of this invention is to use the air demand valve structure of my copending application Serial No. 597,236, filed July 11, 1956, now Patent Number 2,860,631 for Gas Demand Equipment, arranged to permit the air supply valve to operate at an angle to the supply passage to more readily secure the jet pump effect above referred to and to simplify the valve structure.

The invention further consists in the several features hereinafter set forth and more particularly defined by claims at the conclusion hereof.

In the drawings:

Fig. 1 is a top plan view of equipment embodying the invention;

Fig. 2 is a front elevation view of the air demand unit, parts being broken away;

Fig. 3 is a detailed vertical sectional view taken generally on the broken section line 3—3 of Fig. 2;

Fig. 4 is an enlarged view of parts shown in Fig. 3 showing the air valve in its closed position.

The features of the invention are applicable to any gas demand equipment operable in any suitable source of opposing fluid pressure such as water, air, or other gas, and by way of example the invention has been shown applied to air demand equipment used by divers in underwater work.

Referring to the drawings, the letter T designates a tank containing compressed air or other breathable gas and having the usual shut off valve mounted thereon and whose operating handle V is indicated. Tank T is hung from the diver usually by shoulder straps, not shown. As shown in Fig. 3, the outlet of the shut off valve includes a pipe 5 that is clamped in communicating position with a tubular fitting 6 by a yoke 7 having an annular flange portion 8 at one end engageable with an annular flange 9 of fitting 6 and carrying at its other end a clamping screw 10 that engages with the opposite side of the pipe 5 to that of the seating connection 11 between said pipe and fitting 6 by turning said screw 10 inwardly.

Fitting 6 has a threaded connection 12 with air inlet fitting 13 and carries a filter 14 disposed between said fittings in communicating passages 15 and 16 thereof which communicate with the tank supply passages 17 and 18 in the pipe 5.

The air inlet fitting 13 has a flanged upper end 19, a reduced cross threaded portion 20, and an annular groove 21 in which a sealing ring 21A is mounted.

A housing 22, preferably of light cast metal and of cup-shaped form, has a breather tube opening 23 communicating with a breather tube fitting portion 24, an apertured exhaust tube receiving portion 25 formed in its side wall, and a centrally disposed opening 26 in its bottom wall. The top of the housing is closed off by a flexible diaphragm 27 of neoprene or other suitable flexible material having a centrally disposed thin metal plate 28 suitably bonded thereto and protected by an apertured metal cover 29 which with a series of radially disposed screws 30 clamps the peripheral portion of the diaphragm to the open end of the housing.

The usual rubber mouthpiece 31 connects by a rubber fitting 32, carrying the usual exhaust valve (not shown), with one end of the breather tube 33 and one end of the exhaust tube 34. Breather tube 33 connects at its other end with the fitting portion 24 to which it is held by a suitable clamping member 35, and exhaust tube 34 connects at its other end with portion 25 to which it is clamped by a suitable clamping member 36.

The fitting 13 extends through the opening 26, and its flanged end 19 is clamped against the bottom of the housing 22 by a nut 37 mounted on the threaded portion 20 of said fitting and with the sealing ring 21A interposed between said clamped parts.

The flanged end 19 of fitting 13 has concentric differential diameter bores 38 and 39 extending at right angles to the passage 16 which communicates with the bore 39. The outer end of the bore 39 is threaded to receive a threaded seat member 40 in the form of a tube having a bore 41 which opens into the housing 22.

A differential diameter valve 42 is mounted in the housing to work in the bores 38, 39, and 41. Valve 42 has a cylindrical piston or shank portion 43 having a working fit in the bore 38, a ring portion 44 having a predetermined gas rate determining clearance, for example .005″, with the bore 39, a seat ring receiving groove 45 in which the neoprene or other suitable yieldable material seat ring 46 is mounted, a conical portion 47 extending from its larger diameter movable in bore 41 to its smaller diameter connecting with a cylindrical portion 48 and a cylindrical piston portion 49 having a working fit in the bore 41.

A centrally disposed bore or passage 50 in portions 48 and 49 connects the interior of the housing 22 with one or more ports 51 communicating with the space 52 formed between the bore 41 and parts of the valve so that when the valve is open, the pressure gas may flow from bore 39 past the restriction between said bore 39 and the ring portion 44 into the space 52 and through port 51 and passage 50 into the housing 22. The shank portion 43 is provided with a lubricant receiving groove 53 and an elongated groove 54. A sealing O-ring 55 of neoprene or other suitable yieldable material is mounted in groove 54 and is of a cross-sectional diameter such that its inner diameter is larger than that of the bottom of the groove 54. While not absolutely essential, a light spring 56 is interposed between the shoulder formed between the bores 38 and 39 and the ring portion 44 to normally urge the valve to its closed position.

The shank portion 42 of the valve projects beyond the bore 38 and has a diametrically extending slot in which the medial portion of the fulcruming arm end of a lever 57 is pivotally mounted on a pin 58 extending through alined openings in said shank and said lever, this slot being alineable with a slot 59 in the housing extending diametrically of the bore 38 in which the fulcrum end 60 of the lever 57 works.

Lever 57 extends into the housing 22 radially outwardly of the bore 38, and the end of its other arm is pivotally connected by a headed pin 61 with an intermediate portion of another lever 62 whose shorter portion has a curved end face 63 in fulcruming engagement with the bottom of the housing, and whose longer portion 64 extends upwardly and inwardly to a contact engagement with the central portion of the plate 28 on the diaphragm 27.

With the above described arrangement, pressures acting on opposite sides of the diaphragm 27 will through the multiplying levers 57 and 62 act to open the valve 42 or permit its movement to closed position.

As indicated in Fig. 3, a metering valve 65, more fully shown and described in my copending application Serial No. 471,020, filed November 24, 1954, now Patent No. 2,817,334 for Air Demand Equipment, and provided with an exteriorly disposed operating handle 66 may be used, under the control of the operator to provide a metering connection from the tank T to the passage 17 so as to provide a freer flow of air when the air in the tank T drops to a low pressure.

The diameter of the bore 38 is slightly smaller than that of the seat bore 41. By the term "slightly smaller" I mean that this diameter may be from .003" to .010", preferably .003" to .005" smaller than that of the bore 41. The chamber 52 may be termed a pressure reducing chamber, and the clearance, for example .005", between the ring portion 44 of the valve 43 and the bore 39 also provides a pressure reducing throttling restriction which also aids in tending to close the valve. The working fit between the shank 43 of the valve and the bore 38 permits some gas from the chamber formed between the valve 42 and the bore 39 to pass along this piston shank portion of the valve into the space formed by the groove 54 in front of the ring 55 tending in the closed position of the valve to act on said ring to force it into sealing engagement with the bore 38 and the outer side of the groove 54 as indicated in Fig. 4, which gas is then acting on an area equal to the diameter of the bore 38. This gas also acts on the area defined by the seating area of the ring 46 which has substantially a line contact with the bore 41 as this seating area is along the ring diameter and the pressure in chamber 39 is acting on the outer half of said ring. Since as previously noted the seating area of member 40 is slightly larger than the bore 38, there is a differential pressure acting on the head end of the valve 42 tending to close this valve, but since this differential pressure is small, very little effort, for example a force of about one-quarter ounce, plus the resistance of the spring 56 if used, is necessary to be applied to the valve through diaphragm 27, levers 62 and 57 to the exposed end of the valve 42 to open the same.

The opening of the valve is made easier because while the pressure of the air from the chamber formed by bore 39 is as above described acting on ring 46 to hold it in a sealed position relative to the bore 38, this ring being at all times free of the bottom of the groove 54 does not resist the opening of the valve 46 but stays substantially in position as the valve is opened, as shown in Fig. 3. With the valve 46 open, if some of the air passes in the recess formed by the groove 54 around the inner side of the ring 46, then this air can leak by the outer end of the shank 43 of the valve into the air in the housing 22 whose pressure at this time is acting on the end of the shank tending to close the valve as the diameter of shank 43 is larger than that of the head 49.

The opening of valve 42, as shown in Fig. 3, provides a port between the conical part 47 and the bore 41 that is in the form of a variable throttling restriction between the chamber formed by bore 39 and the chamber 52 which has the effect of reducing the pressure of the air or gas going into the housing 22. The port or ports 51 being of a fixed predetermined diameter also act to reduce the pressure of air passing to the housing via said port or ports and the passage 50 so that it has been found that a separate pressure regulator in the air pressure supply line is not necessary.

The tapered passage to chamber 52 also acts to increase the velocity of air passing into this chamber, which air acting against the shoulder formed by the back end of the head 49 has a constant tendency to move the open valve to a closed position so that when the diaphragm 27 moves outwardly and pressures tending to open the valve are released, the valve 42 will tend to or be automatically closed.

Because the differential pressure acting on the ring 46 to seal the valve is very small, there is no danger of fracturing this ring or causing its extrusion into the bore 41 so that said ring will have a long life. The application of the force in the opposite direction against the ring 55, as previously noted, tends to relieve pressure on the ring 46, and at the same time it permits the shank 43 to slide freely in the direction of the air pressure. Also the ring 55 does not interfere with the closing of the valve as above described.

By selecting the proper diameters for the bores 38 and 41 the mechanism can be regulated to release a metered amount of air through the port or ports 51, it being noted that the conical part 47 of the valve 42 also provides a variable metering orifice.

As in all devices of this kind, the water or other fluid pressure acting on the outer surface of the diaphragm 27 is opposed by the air or gas pressure from the supply tank introduced in the housing 22 on the other side of said diaphragm past the valve 42. As the air in the housing is used up by the diver, the pressure in this chamber is decreased so that the water pressure acting on the outside of the diaphragm acts to move it inwardly, thus swinging the end 64 of the lever 62 downwardly so that through its fulcrum 63 an upward swinging movement is exerted on the outer end of the lever 57 causing it to swing about its fulcrum connection with the head 19 and thus exert an opening pressure on the valve 42 to admit more air into the housing and equalize the pressure therein with the pressure of the surrounding water media. Thus the valve 42 is opened and closed in accordance with the diver's requirements, and the valve operating mechanism follows the movements of the diaphragm under the action of the forces acting on the opposite sides thereof.

Usually the air released into the diaphragm covered space in the housing 22 is directed upwardly toward the diaphragm and as a result after the operator's first breathing impulse which acts to reduce the pressure in the housing to open the valve 42, this air acting on the diaphragm tends to oppose the inward movement of the diaphragm and, therefore, requires a further breathing effort on the part of the operator to keep the valve 42 open, and this effort is more pronounced when the diver submerges. With the pressure air supply inlet via passage 50 to the housing 22 arranged to discharge the pressure air toward the side of the housing so as to direct more or less of this air through the lower pressure air in the housing 22 into the opening 23, the breather tube passage 24, and breather tube 33 there is produced a jet pump effect, that is, the higher pressure air as it enters the breather tube has a suction effect on the lower pressure air in the housing that prevents, more or less depending upon the positioning of the passage 50 relative to the opening 23, this entering supply air from interfering with the inward movement of the diaphragm, and as a result after the first breathing impulse of the operator, the valve 42 may be kept open by the operator without undue effort on the part of the operator. However, since the breathing effort necessary to keep the valve 42 open varies with the type of fluid media in which the operator is in, for example in air or in the water, and since the air pressure supply and hence the jet pump effect varies as the air from the tank is used up, it is highly desirable that means, under the control of the operator, be provided for varying the jet pump effect to suit operating conditions. Referring to Figs. 2 and 3, it will be noted that the passage 50 is radially positioned relative to the breather tube opening 23 to discharge the high pressure supply air directly toward the breather tube opening 23 so that the desired jet pump effect, above described, may be produced to assist the diver in keeping the valve 42 open. To vary this jet pump action I have provided a deflector blade or member 67 mounted on an angularly adjustable or rotatable shaft 68 that is journaled in a fitting 69 mounted in the bottom of the housing in fluid-tight relation therewith by the clamping of said fitting thereto by the shoulder 70 on the fitting, the sealing O-ring 71 and the nut 72 in threaded engagement with the exposed lower end of said fitting, the fitting preferably being arranged so that the longitudinal axis of the shaft 68 is in radial alinement with the vertical axis of the passage 50, though this may be varied to some extent without departing from the invention. The shaft 68 extends down through the central bore of the fitting 69, and its exposed outer end has a hand lever 73 connected thereto. A spring washer 74 is interposed between the fitting 69 and a collar 75 on said shaft 68 to hold said deflector blade 67 in its desired adjusted position. The lever 73 extends laterally outwardly relative to the bottom of the housing and then upwardly adjacent the side of the housing 22 to a hand knob 76 which is in the reach of either hand of the diver when the apparatus is on the diver, and by his manipulation of this lever the deflector 67 may be moved from its full line position, shown in Fig. 2, for a full jet pump effect to its dotted line position there shown in which the pressure air is deflected away from the opening 23 and against the side of the housing. When the diver is out of or is entering the water not as much breathing effort is required on his part to keep the valve 42 open so that the deflector 67 may be shifted to or toward the dotted line position as under these conditions if the deflector were in its full line position he would get more air than he needed, but when he submerges, he is definitely helped by the jet pump effect and can, therefore, turn the deflector toward or into its full line position to best suit his needs and accommodate the varying air pressure supplied to him by the tank as this supply air is used up.

I desire it to be understood that this invention is not to be limited to any particular form or arrangement of parts except in so far as such limitations are included in the appended claims.

What I claim as my invention is:

1. In gas demand equipment, the combination of a housing having a breather tube opening and an open end, a breather tube communicating with said opening, a flexible diaphragm covering said open end, a supply of gas under pressure, conduit means connecting said gas supply with an outlet communicating with said housing, a valve controlling the passage of said pressure gas to said outlet, means operatively connecting said valve with said diaphragm to open and close said valve in response to differences in pressure on the inner and outer sides of said diaphragm, said outlet and breather tube opening arranged to produce a jet pump effect tending to keep said valve open after it has been opened by the operator's inhalation through said breather tube, and means, controlled by the operator, for varying said jet pump effect to suit the operating conditions of said equipment.

2. In gas demand equipment, the combination of a housing having a breather tube opening and an open end, a breather tube communicating with said opening, a flexible diaphragm covering said open end, a supply of gas under pressure, conduit means connecting said gas supply with an outlet communicating with said housing, a valve controlling the passage of pressure gas to said outlet, means operatively connecting said valve with said diaphragm to open and close said valve in response to differences in pressure on the inner and outer sides of said diaphragm, said outlet and breather tube opening arranged to produce a jet pump effect tending to keep said valve open after it has been opened by the operator's inhalation through said breather tube, deflector means interposed between said outlet and said breather tube opening adjustable to vary said jet pump effect, and means exterior of said housing, and under the operator's control to variably position said deflector means to suit the operating conditions of said equipment.

3. Gas demand equipment as defined in claim 2, wherein the deflector means is a deflector blade mounted on a shaft journalled in a wall of the housing and extending exteriorly thereof and the means under the operator's control for variably positioning said deflector means is a lever extending outwardly to position adjacent a side of the housing.

4. In gas demand equipment, the combination of a housing, a supply of gas under pressure, valve mechanism for controlling the passage of said pressure gas to said housing comprising a conduit connecting said supply with said housing, said conduit including a bore opening into said housing and having a valve seat at its other end, a bore spaced from and concentric with but slightly less in cross-sectional area than the first named bore, a chamber formed between said seat and the second named bore and of larger area than either of said bores and connected with said supply, a valve member having a seat disposed in said chamber and acting to close said first named bore and extending through said chamber and having a piston shank portion working in said second named bore and extending at its outer end into said housing, sealing means for said shank portion, the gas from said supply acting upon the differential area between said first and second bores to normally urge the valve to closed position, and fluid pressure operated means acting in response to a gas demand and operatively connected to the outer end of said shank portion to move said valve member to open position.

5. Gas demand equipment as defined in claim 4, wherein the valve has a ring portion working in the chamber between said bores having a predetermined clearance relative to the wall of said chamber to form a throttling restriction.

6. Gas demand equipment as defined in claim 4, wherein the sealing means for said piston shank portion of the valve is a sealing ring of yieldable material mounted in an elongated annular groove in said piston and yieldingly engageable with said second named bore but free at times from the bottom of said groove, said ring in the closed position of the valve adapted to sealingly engage one end of said groove.

References Cited in the file of this patent
UNITED STATES PATENTS 2,616,442    Holmes _____ Nov. 4, 1952
2,821,980    Westell _____ Feb. 4, 1958